US010323675B2

(12) United States Patent
Oso et al.

(10) Patent No.: US 10,323,675 B2
(45) Date of Patent: Jun. 18, 2019

(54) DEVICE WITH ADJUSTMENT BOLT

(71) Applicant: KUBOTA Corporation, Osaka-shi, Osaka (JP)

(72) Inventors: Hiroki Oso, Sakai (JP); Naoya Sakurai, Sakai (JP); Takumi Fukuda, Sakai (JP); Mitsugu Okuda, Sakai (JP); Wataru Iwanaga, Sakai (JP); Yusuke Suzuki, Sakai (JP); Takahiro Kajihara, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 182 days.

(21) Appl. No.: 15/617,084

(22) Filed: Jun. 8, 2017

(65) Prior Publication Data

US 2017/0370397 A1    Dec. 28, 2017

(30) Foreign Application Priority Data

Jun. 24, 2016  (JP) .................... 2016-125409
Jun. 24, 2016  (JP) .................... 2016-125411

(51) Int. Cl.
F16B 39/12    (2006.01)
F16B 39/08    (2006.01)
(Continued)

(52) U.S. Cl.
CPC ............ F16B 39/12 (2013.01); F16B 21/183 (2013.01); F16B 37/14 (2013.01); F16B 39/08 (2013.01); F16B 41/005 (2013.01)

(58) Field of Classification Search
CPC ...... F16B 21/18; F16B 21/183; F16B 21/186; F16B 37/04; F16B 37/14; F16B 39/08;
(Continued)

(56) References Cited

U.S. PATENT DOCUMENTS 2,390,103 A * 12/1945 Johnson .............. F16L 19/005
                                                285/116
3,610,063 A * 10/1971 Hart ...................... F16B 21/18
                                                  24/627
(Continued)

FOREIGN PATENT DOCUMENTS

DE    102013214349 A1    1/2015
EP        0019361 A1    11/1980
(Continued)

OTHER PUBLICATIONS

Extended Search Report dated Nov. 22, 2017 in EP Application No. 17173065.

Primary Examiner — Roberta S Delisle
(74) Attorney, Agent, or Firm — Panitch Schwarze Belisario & Nadel LLP

(57) ABSTRACT

A device with an adjustment bolt includes a bolt attachment wall, an adjustment bolt screwed with an internal thread hole of the bolt attachment wall, a locknut screwed with the adjustment bolt, a cover that surrounds the adjustment bolt and the locknut, and a stopper unit that prevents removal of the cover from the locknut. The stopper unit includes an inner circumference groove of the cover fitted around a C-shaped retaining ring, and an external circumference groove of the locknut fitting within the retaining ring. The external circumference groove includes a first groove portion having a large-diameter groove bottom that restricts contraction and removal of the retaining ring fitted within the inner circumference groove, and a second groove portion provided continuously for the first groove portion and having a small-diameter groove bottom that allows contraction and removal of the retaining ring fitted within the inner circumference groove.

15 Claims, 13 Drawing Sheets

(51) Int. Cl.
   *F16B 21/18*   (2006.01)
   *F16B 37/14*   (2006.01)
   *F16B 41/00*   (2006.01)

(58) Field of Classification Search
   CPC .......... F16B 39/10; F16B 39/12; F16B 39/14;
                     F16B 41/002; F16B 41/005
   USPC ......... 411/248, 352–353, 516, 517, 526, 528
   See application file for complete search history.

(56) References Cited

U.S. PATENT DOCUMENTS

| | | | |
|---|---|---|---|
| 5,071,300 A | 12/1991 | McCauley | |
| 2008/0166202 A1* | 7/2008 | Dunlap | ................... F16B 37/00 |
| | | | 411/353 |
| 2013/0142589 A1* | 6/2013 | Keech | ...................... F16B 5/02 |
| | | | 411/352 |
| 2014/0259617 A1 | 9/2014 | Kompa et al. | |

FOREIGN PATENT DOCUMENTS

| | | |
|---|---|---|
| EP | 2469106 A1 | 6/2012 |
| GB | 1031999 A | 6/1966 |
| JP | H07049069 A | 2/1995 |
| JP | 07071345 A | 3/1995 |
| JP | H09137820 A | 5/1997 |
| WO | 2007072473 A2 | 6/2007 |

\* cited by examiner

DEVICE WITH ADJUSTMENT BOLT

BACKGROUND OF THE INVENTION

(1) Field of the Invention

The present invention relates to a device with adjustment bolt.

(2) Description of Related Art

A problem of conventional technique is that a cover, which is provided for preventing alteration of an adjustment position of an adjustment bolt, may be possibly removed in an unauthorized manner due to deformation or destruction of a peripheral wall of the cover.

SUMMARY OF THE INVENTION

An object of the present invention is to provide a device with adjustment bolt capable of preventing unauthorized removal of a cover that is provided to prevent alteration of an adjustment position of an adjustment bolt.

The present invention provides a device with adjustment bolt comprising:

a bolt attachment wall having an internal thread hole;

an adjustment bolt screwed with the internal thread hole and attached to the bolt attachment wall;

a locknut screwed with the adjustment bolt;

a cover fitted around the locknut, the cover having a tubular unit that surrounds the adjustment bolt and the locknut; and a stopper unit causing the cover to be in a removal disallowed state from the locknut, wherein the stopper unit includes a retaining ring, an attachment inner circumference unit provided for the cover so as to allow internal attachment to the retaining ring in the removal disallowed state, and an external circumference groove provided for the locknut so as to allow external attachment to the retaining ring, the external circumference groove includes a first groove portion and a second groove portion provided continuously for the first groove portion on a side of the bolt attachment wall, the first groove portion having a groove bottom that restricts removal of the retaining ring fitted within the attachment inner circumference unit from the attachment inner circumference unit due to contraction, the second groove portion having a groove bottom that allows removal of the retaining ring fitted within the attachment inner circumference unit from the attachment inner circumference unit due to contraction.

According to the present invention, it is possible to provide an effect of preventing unauthorized removal of the cover for sealing the adjustment bolt so as not to allow re-adjustment of the adjustment bolt after shipping.

Specifically, the cover to be removed from the locknut away from the bolt attachment wall is configured to be locked to the locknut by the retaining ring. Therefore, it is possible to prevent unauthorized removal of the cover, as a tool insertion opening such as a slit for deformation is not required for a peripheral wall of the cover, and the cover may not be removed unless the retaining ring is destructed by shear fracture, which requires an extremely powerful force.

As a result, a device with adjustment bolt capable of preventing unauthorized removal of the cover that prevents alteration of the adjustment position of the adjustment bolt may be provided by making an original attempt providing the locknut with an external circumference groove including a groove that allows and a groove that does not allow contraction to remove the retaining ring from the attachment inner circumference unit provided for an inner circumference of the cover.

BRIEF DESCRIPTION OF THE DRAWINGS

FIG. 8A is a partially cut-out front view of a portion near the adjustment bolt, and FIG. 8B is an enlarged cross-sectional view of the main part illustrating a retaining structure of the cover;

DETAILED DESCRIPTION OF PREFERRED EMBODIMENTS

Hereinafter, embodiments of a device with adjustment bolt according to the present invention will be described with reference to the drawings, taking a diesel engine with fuel adjustment bolt where the diesel engine is a vertical inline multi-cylinder engine as one example.

Figure 2:
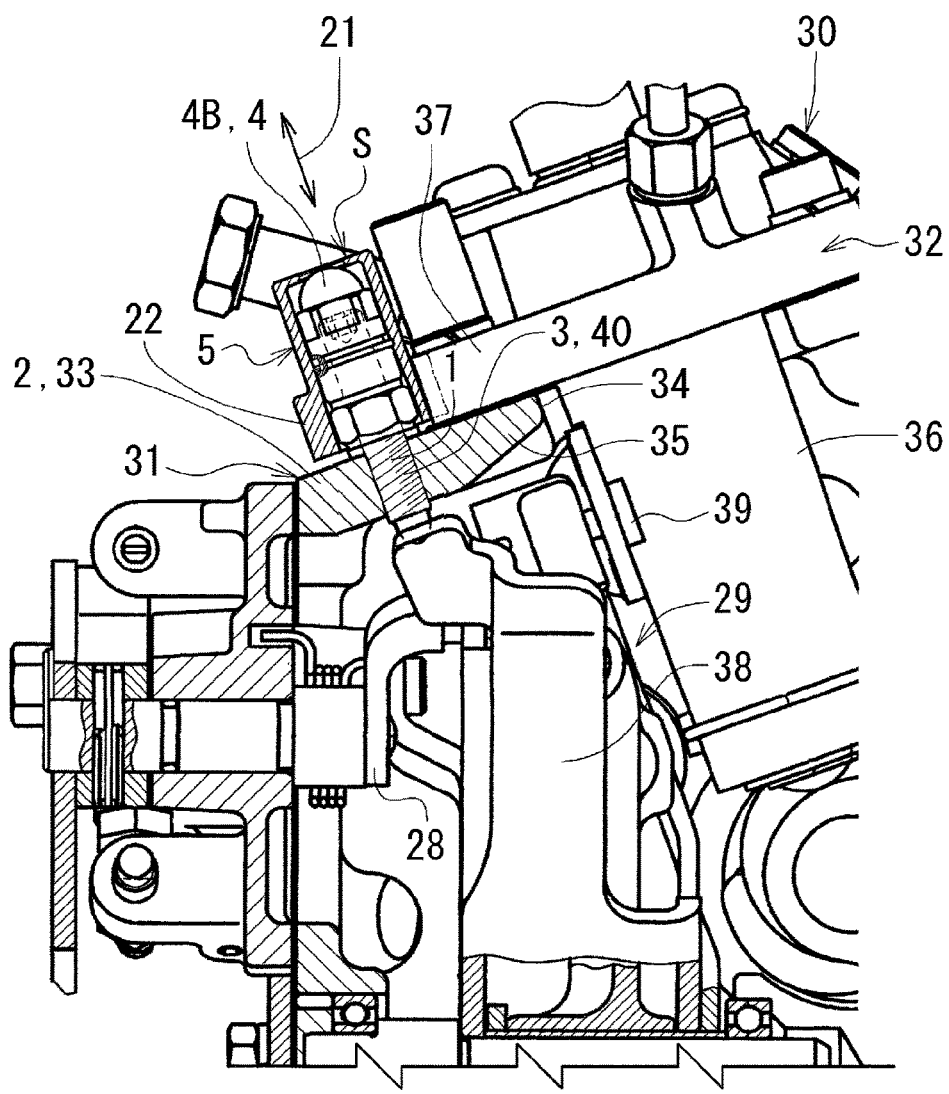
FIG. 2 is a longitudinal sectional view of a main part of a diesel engine having the adjustment bolt illustrated in FIG. 1.

As illustrated in FIG. 2, the diesel engine includes a fuel injector device 30. The fuel injector device 30 includes a pump container case 31, a fuel injector pump 32, and a mechanical governor 29.

Taking a width direction of a crankcase (not illustrated) as a crosswise direction, the pump container case 31 is formed on a side of the crankcase by monoblock casting with the crankcase, and includes a pump insertion opening 34 in an upper wall 33, and a pump attachment seat 35 is provided for the pump insertion opening 34 along an opening peripheral edge.

The fuel injector pump 32 is a plunger-type inline pump of a Bosch type, and a plunger 36 of the fuel injector pump 32 is inserted into the pump container case 31 through the pump insertion opening 34, a flange 37 of the fuel injector pump 32 is attached to the pump attachment seat 35 with a hexagon socket head cap screw or the like, and the plunger 36 is contained within the pump container case 31.

As illustrated in FIG. 2, the mechanical governor 29 is contained within the pump container case 31, controls the fuel injector pump 32, and maintains a rotating speed of the engine at a target rotating speed set by a speed limiter lever 28 regardless of load change. The mechanical governor 29 includes a governor lever 38 that swings by an unbalanced force between a spring force of a governor spring (not illustrated) and a governor force of a flyweight (not illustrated), and a fuel amount control rack 39 of the fuel injector pump 32 is controlled by swinging of the governor lever 38.

As illustrated in FIG. 2, a fuel conditioner 40 is provided for the upper wall 33 of the pump container case 31. The fuel conditioner 40 adjusts a maximum amount of fuel consumption at a rated rotating speed of the engine, and a maximum power output of the engine is controlled.

Figure 1:
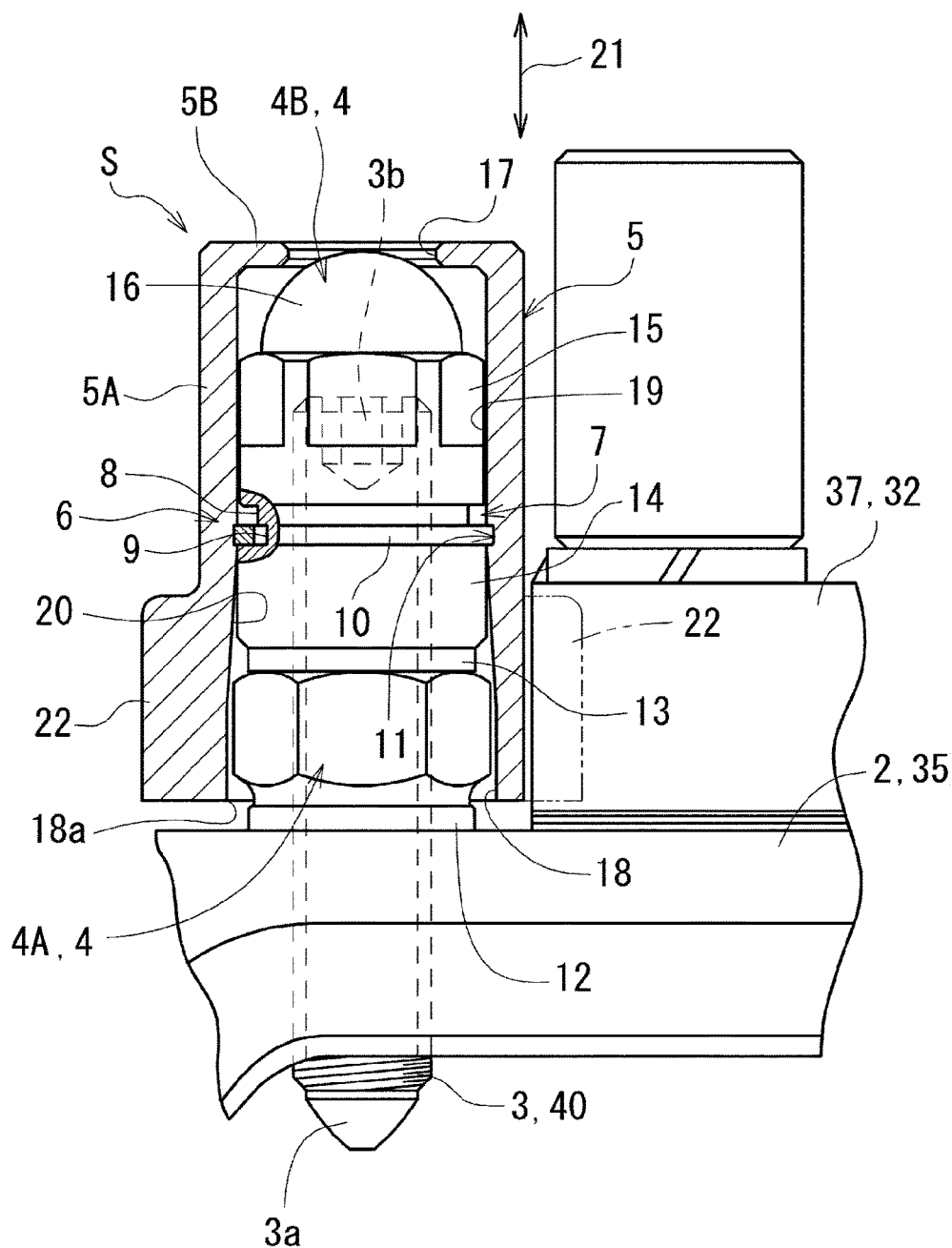
FIG. 1 is a partially cut-out front view illustrating a structure of an adjustment bolt for an amount of fuel consumption (Embodiment 1)

As illustrated in FIG. 1, the fuel conditioner 40 includes an adjustment bolt 3 as an axial bolt having a bolt end 3a and a rotary adjusting groove 3b at a base end and screwed into a bolt attachment wall 2 (the pump attachment seat 35), and a locknut 4. Specifically, the adjustment bolt 3 is positioned and fixed by manipulating the locknut 4 after adjusting the adjustment bolt 3 by rotating it with the rotary adjusting groove 3b as a tool engagement unit using a flathead screwdriver. Here, a reference number 12 corresponds to a plain washer.

The adjustment bolt 3 which is a key component of the fuel conditioner 40 is screwed with an internal thread hole 1, and inserted into and attached to the bolt attachment wall 2, and the bolt end 3a of the adjustment bolt 3 projects into the pump container case 31. The bolt end 3a is positioned on a fuel increasing swinging side of the governor lever 38, and receives the governor lever 38 to determine a swing position of the governor lever 38 on the fuel increasing side. Thus, the maximum amount of fuel consumption may be adjusted by adjusting a screwing amount of the adjustment bolt 3.

Embodiment 1

As illustrated in FIG. 1 and FIG. 2, there is provided an adjustment prevention mechanism S that inhibits an adjustment function of the fuel conditioner 40 by disallowing rotating manipulation of the adjustment bolt 3.

As illustrated in FIG. 1, the function of the adjustment prevention mechanism S is such that the locknut 4 is covered and sealed by a cover 5 to prevent alteration of an adjustment position of the adjustment bolt 3 after an amount of fuel consumption at the maximum power output of the engine is adjusted by the adjustment bolt 3. The cover 5 is configured such that the cover 5 may not be removed without destruction once attached to the locknut 4. Next, the adjustment prevention mechanism S will be described in detail.

As illustrated in FIG. 1 and FIG. 2, the adjustment prevention mechanism S includes the bolt attachment wall 2 provided with the internal thread hole 1, the adjustment bolt 3, the locknut 4 screwed with the adjustment bolt 3, the cover 5 having a tubular unit 5A that surrounds the adjustment bolt 3 and the locknut 4 and fitted around the locknut 4, and a stopper unit 6 that causes the cover 5 to be in a removal disallowed state from the locknut 4.

The locknut 4 is configured in a double-nut structure having a first locknut 4A in contact with the bolt attachment wall 2 with a plain washer 12 interposed therebetween, and a second locknut 4B in contact with the first locknut 4A with a plain washer 13 interposed therebetween. The second locknut 4B is configured as a hexagon cap nut having a columnar body portion 14, a nut portion 15, and a semi-spherical cap 16.

The stopper unit 6 includes a C-shaped retaining ring 10, an attachment inner circumference unit 11 provided for the cover 5 so as to allow internal attachment to the retaining ring 10 in the removal disallowed state, and an external circumference groove 7 provided for the body portion 14 of the second locknut 4B so as to allow external attachment to the retaining ring 10. Here, an inner circumference groove 11 is employed as one example of the attachment inner circumference unit 11.

The external circumference groove 7 includes a first groove portion 8 having a groove bottom 8a that restricts removal of the retaining ring 10 that is internally attached to, that is, fitted within the inner circumference groove 11 from the inner circumference groove 11 due to contraction, and a second groove portion 9 provided continuously for the first groove portion 8 on a side of the bolt attachment wall and having a groove bottom 9a that allows removal of the retaining ring 10 fitted within the inner circumference groove 11 from the inner circumference groove 11 due to contraction.

Figure 3A:
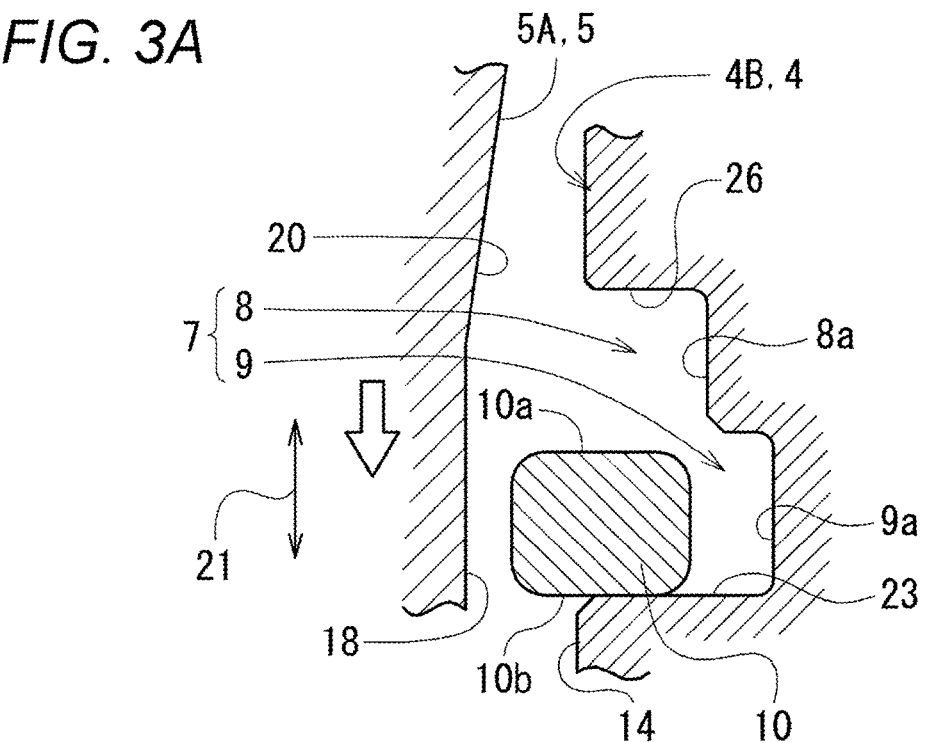
FIG. 3A is a cross-sectional view of a main part illustrating a positional relation between an attachment groove and a retaining ring for a hexagon cap nut in an unlocked state.
Figure 3B:
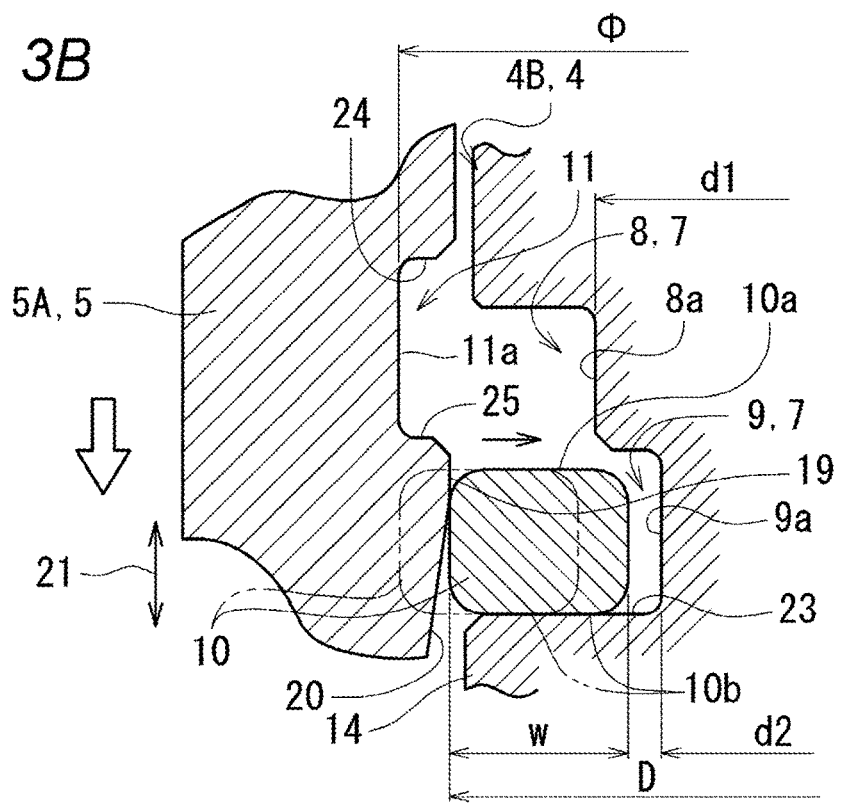
FIG. 3B is a cross-sectional view of the main part illustrating contracting deformation of the retaining ring when starting an operation of moving the cover downward.

As illustrated in FIG. 3B, in the cover 5, it is defined that a diameter of a main inner circumferential face 19 having a smallest diameter that forcibly contracts the retaining ring 10 to allow its passage, specifically, a diameter of a short main inner circumferential face (passage restricting inner circumferential face) 19 between a tapered inner circumferential face 20 and the inner circumference groove 11 is D, a width of the retaining ring 10 in a diameter direction is w, a diameter of the groove bottom 8a of the first groove portion 8 is d1, and a diameter of the groove bottom 9a of the second groove portion 9 is d2. In this case, the following expressions (1) and (2) are established.

$$d1 > D - 2w \qquad (1)$$

$$d2 < D - 2w \qquad (2)$$

Specifically, the expression (1) expresses a configuration of "the groove bottom 8a that restricts removal of the retaining ring 10 fitted within the attachment inner circumference unit 11 from the attachment inner circumference unit 11 due to contraction of the retaining ring 10", and the expression (2) expresses a configuration of "the groove bottom 9a that allows removal of the retaining ring 10 fitted within the attachment inner circumference unit 11 from the attachment inner circumference unit 11 due to contraction of the retaining ring 10". However, where a diameter of the inner circumference groove 11 is Φ, the following expression (3) is established so as to allow a state illustrated in FIG. 5A.

$$d1 < \Phi - 2w \quad (3)$$

Specifically, the groove bottom 8a of the first groove portion 8 is configured such that "Φ−2w>d1>D−2w" is established.

Here, the expression (3) is configured when an external diameter of the retaining ring 10 fitted within the inner circumference groove 11 matches the diameter Φ of the inner circumference groove 11, that is, when the diameter Φ of the inner circumference groove 11 is the same as or smaller than the external diameter of the retaining ring 10 in an unlocked state. In order to establish the expression (3) when the diameter Φ of the inner circumference groove 11 is slightly larger than the external diameter of the retaining ring 10 in the unlocked state, the external diameter of the retaining ring 10 in an unlocked state should be taken as Φ in place of the diameter of the inner circumference groove 11.

As illustrated in FIG. 1 and FIG. 2, the cover 5 includes the tubular unit 5A having a cylindrical cross-section, and a cap portion 5B having a circular hole 17 in the center, and an opening side of the tubular unit 5A is configured as a large-diameter reinforced portion 22.

An inner circumferential portion of the tubular unit 5A includes an opening inner circumferential face 18 having a largest and even diameter and provided on a bolt attachment wall side (tip end side), the main inner circumferential face 19 having a diameter smaller than that of the opening inner circumferential face 18 and provided on a side opposite of the bolt attachment wall side (base end side), and the tapered inner circumferential face 20 having a diameter variable along a bolt axis direction 21 and connecting the opening inner circumferential face 18 with the main inner circumferential face 19.

Specifically, the inner circumferential portion of the cover 5 is provided with the tapered inner circumferential face 20 tapered inwardly and having an opening portion 18a having a diameter larger than the external diameter of the retaining ring 10 in the unlocked state on a bolt attachment wall side of the inner circumference groove 11. The inner circumference groove 11 is provided for the main inner circumferential face 19 near a border with the tapered inner circumferential face 20.

Figure 7:
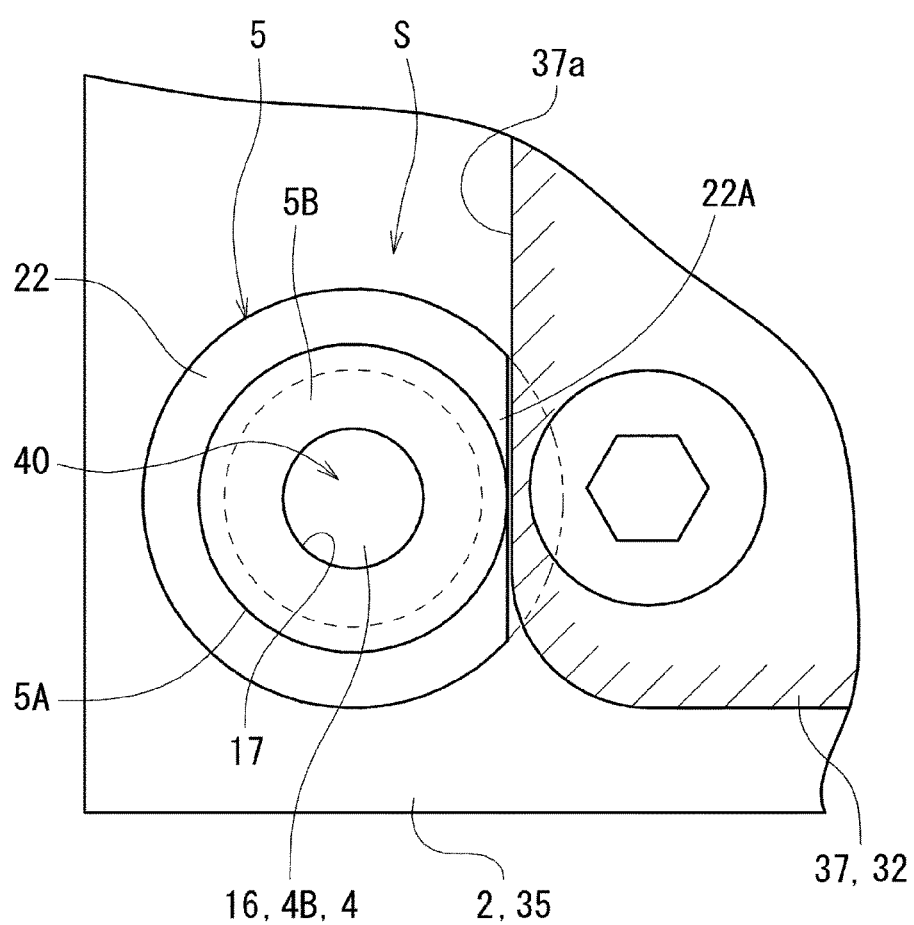
FIG. 7 is a plan view of a main part illustrating a rotation prevention structure of the cover.

Here, as illustrated in FIG. 7, the reinforced portion 22 of the cover 5 is provided with a flat face 22A that is partially depressed so as to have a D-shaped cross-section. The flat face 22A is configured to have a shape and dimensions so as to be closely fitted with a flat side face 37a of the flange 37 of the fuel injector pump 32 with only a small gap in the state fitted around the locknut 4. Therefore, in the state fitted around the locknut 4, the cover 5 may not be manipulated to rotate due to a structure in which the flat face 22A and the side face 37a face closely each other.

Figure 6A:
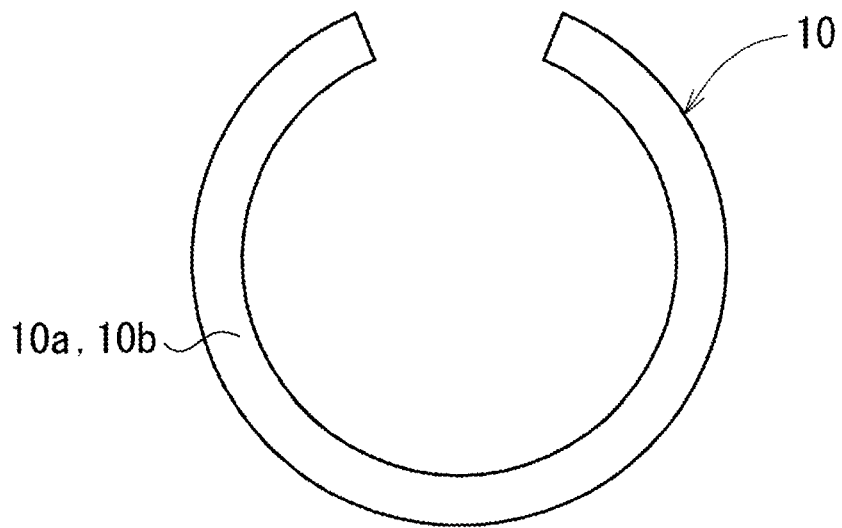
FIG. 6A is a plan view of the retaining ring.
Figure 6B:
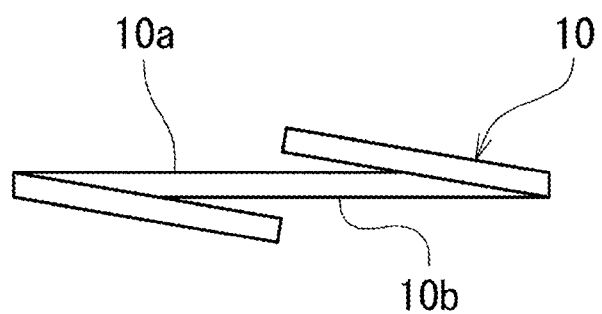
FIG. 6B is a front view of the retaining ring.

As illustrated in FIG. 6A, the retaining ring 10 is configured as a circlip having a constant width a in the diameter direction that is the C-shaped retaining ring 10. Further, as illustrated in FIG. 6B, the retaining ring 10 is also configured helically twisted in its thickness direction. For example, the helical retaining ring 10 is provided in a manner a coil spring is formed. Due to its helical shape, when fitted with the inner circumference groove 11 and the external circumference groove 7, the retaining ring 10 may be constantly pressed and urged to be brought in contact with the inner circumference groove 11 and the external circumference groove 7 in the bolt axis direction 21. This provides an advantageous effect of prevention of noises due to vibration or the like.

Next, a process for attachment of the cover 5 to the locknut 4 by the adjustment prevention mechanism S and an effect thereof will be described. First, the retaining ring 10 illustrated in FIGS. 6A and 6B is fitted into the external circumference groove 7, more specifically, the second groove portion 9, of the second locknut 4B that is screwed into and fixed to the adjustment bolt 3.

Then, as illustrated in FIG. 3A, the cover 5 is moved downward onto the adjustment bolt 3 in a manner the reinforced portion 22 faces downward. At this time, as a diameter of the opening inner circumferential face 18 is larger than the external diameter of the retaining ring 10 in the unlocked state, the retaining ring 10 is maintained to be placed on a lower-side circumferential face 23 of the external circumference groove 7.

Continuing downward movement of the cover 5, as illustrated in FIG. 3B, the tapered inner circumferential face 20 is brought into external contact with the retaining ring 10, and a strong inward force in the diameter direction is produced due to slight inclination of the tapered inner circumferential face 20 in the bolt axis direction 21. Thus, the retaining ring 10 is forcibly contracted and deformed while being in contact with the lower-side circumferential face 23.

Figure 4A:
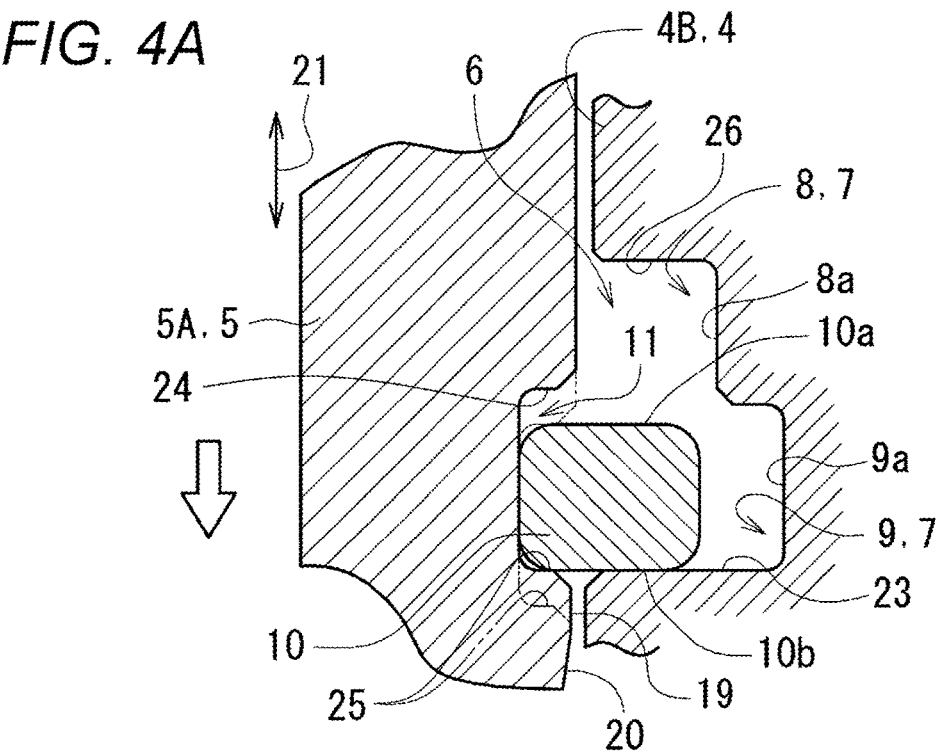
FIG. 4A is a cross-sectional view of the main part illustrating expanding deformation of the retaining ring to the cover inner circumference groove by downward movement of the cover.

Further continuing downward movement of the cover 5, as illustrated in FIG. 4A, upon relative movement and positioning of the retaining ring 10 at the inner circumference groove 11 beyond an end portion of the main inner circumferential face 19, the retaining ring 10 instantaneously expands and deforms due to an elastic restoring force to be internally fitted within the inner circumference groove 11. Then, the cover 5 stops moving downward when an upper side circumferential face 24 on the side opposite of the bolt attachment wall side (upper side) of the inner circumference groove 11 is brought into contact with an upper face 10a of the retaining ring 10. This is a fitted state illustrated in FIG. 1. If an expanding elastic force of the retaining ring 10 is strong, the cover 5 may often not be moved down to a position at a lower end.

Now, as illustrated in FIG. 1 and others, a case in which the cover 5 assembled with the second locknut 4B into the fitted state is moved upward to be removed will be described.

Figure 4B:
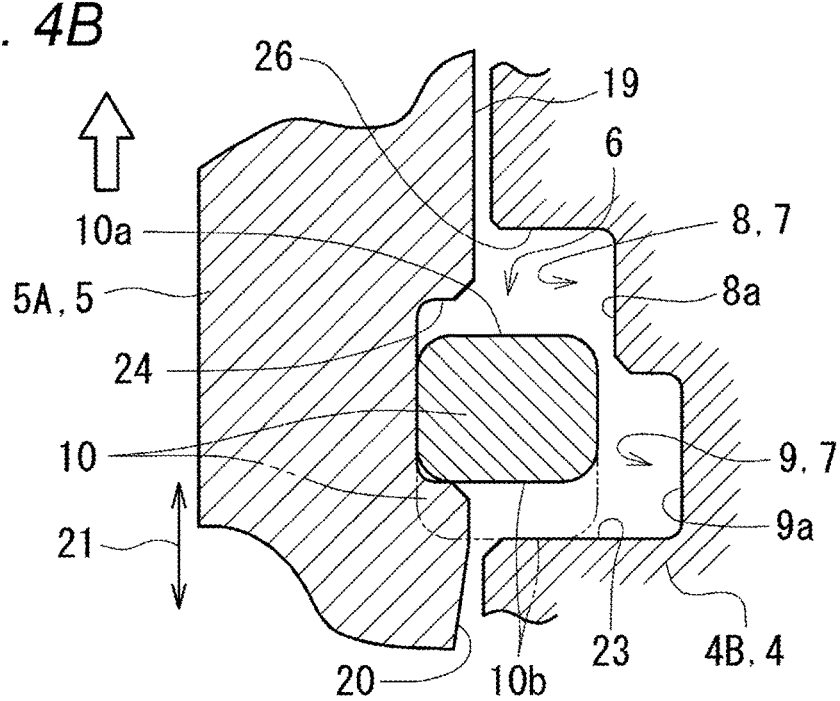
FIG. 4B is a cross-sectional view of the main part illustrating how the retaining ring moves upward along with the cover moving upward.

Upon upward movement of the cover 5 in the fitted state illustrated by an imaginary line or a solid line in FIG. 4A, as illustrated in FIG. 4B, a lower-side circumferential face 25 of the inner circumference groove 11 on a bolt attachment wall side (lower side) is also moved upward in contact with the retaining ring 10 placed on the lower-side circumferential face 23 of the external circumference groove 7.

Figure 5A:
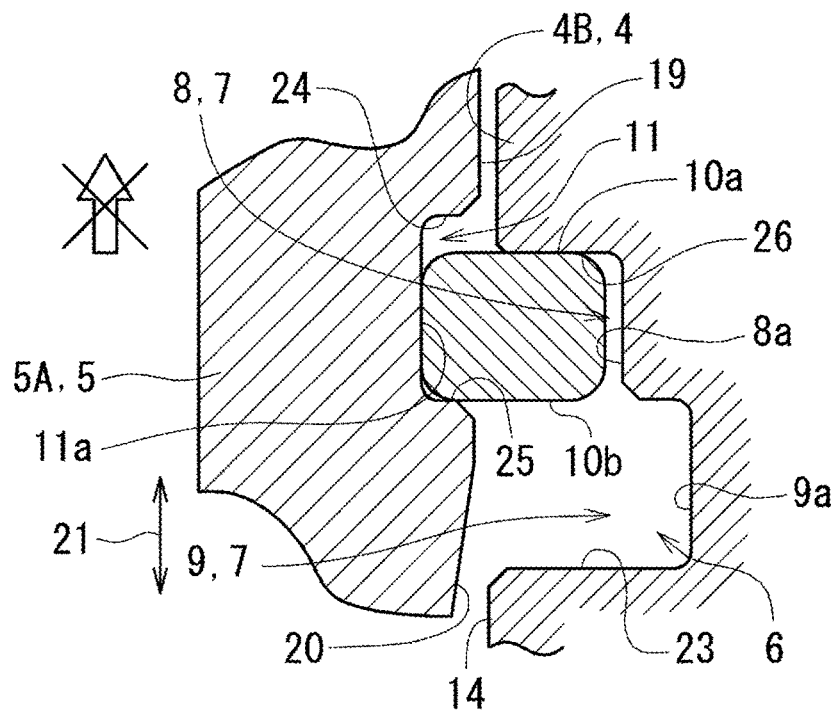
FIG. 5A is a cross-sectional view of the main part illustrating movement of the retaining ring to a restricting groove along with the cover moving upward, and a locked state.
Figure 5B:
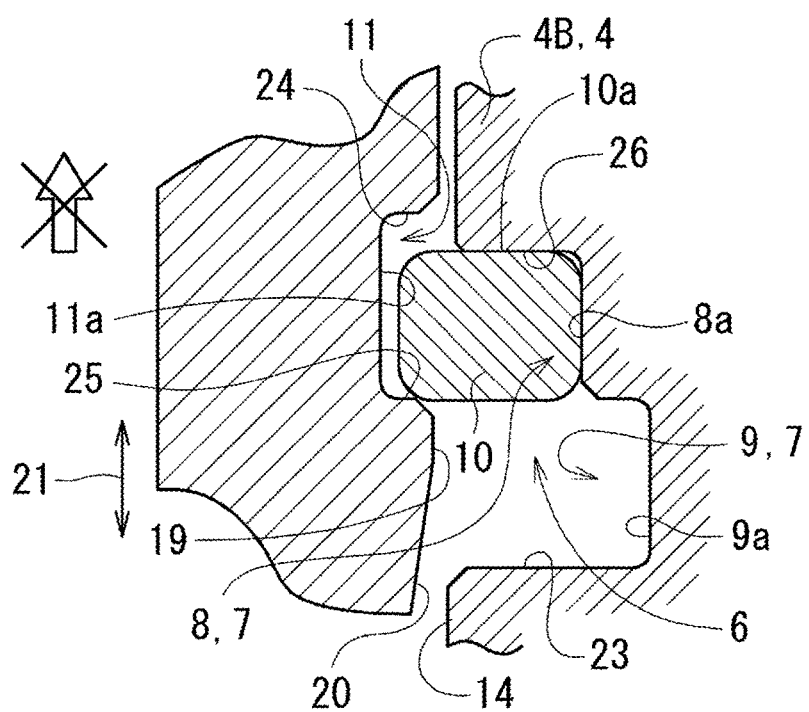
FIG. 5B is a cross-sectional view of the main part illustrating the locked state by the retaining ring that has been contracted and deformed.

Continuing upward movement of the cover 5, as illustrated in FIG. 5A, the upper face 10a of the retaining ring 10 that moves along is brought into contact with an upper-side circumferential face 26 of the external circumference groove 7, stopping further upward movement of the cover 5. At this time, as illustrated in FIG. 5B, even if the retaining ring 10 is flexed and twisted, or even if the retaining ring 10 is contracted due to a machining error in dimensions (e.g., chamfering of corners being large), the retaining ring 10 that has moved along is at the first groove portion 8, and its contraction for deformation is almost entirely restricted by the groove bottom 8a.

Therefore, even if the retaining ring 10 is contracted at the first groove portion 8, the lower-side circumferential face 25 of the inner circumference groove 11 remains in contact with a lower face 10b of the retaining ring 10, and upward movement of the cover 5 is inhibited. Specifically, the external circumference groove 7 includes the first groove portion 8 having the groove bottom 8a that restricts removal from the inner circumference groove 11 due to contraction of the retaining ring 10 fitted within the inner circumference groove 11, and the second groove portion 9 provided continuously for the first groove portion 8 on the side of the bolt attachment wall and having the groove bottom 9a that allows removal of the retaining ring 10 fitted within the inner circumference groove 11 from the inner circumference groove 11 due to contraction.

As described above, there is provided the adjustment prevention mechanism S that disallows removal of the cover 5 by upward movement after the cover 5 is assembled with the adjustment bolt 3 with which the locknut 4 having the retaining ring 10 is screwed by moving the cover 5 down until the retaining ring 10 is fitted within the inner circumference groove 11. Thus, by attachment of the cover 5 to the locknut 4 (to the adjustment bolt 3), the adjustment prevention mechanism S locks so as not to allow rotating manipulation of the adjustment bolt 3.

In order to forcibly remove the cover 5, it is necessary to cause shear fracture to the retaining ring 10, and therefore an advantageous effect that a pull-up bearing force of the cover 5 improves to a large extent (e.g., a load bearing of 1 to 2 tons) is provided as compared to a unit for pressing the cover into the locknut or for partially cutting and flexing the lower end of the cover inwardly to latch the locknut, for example.

Figure 8A:
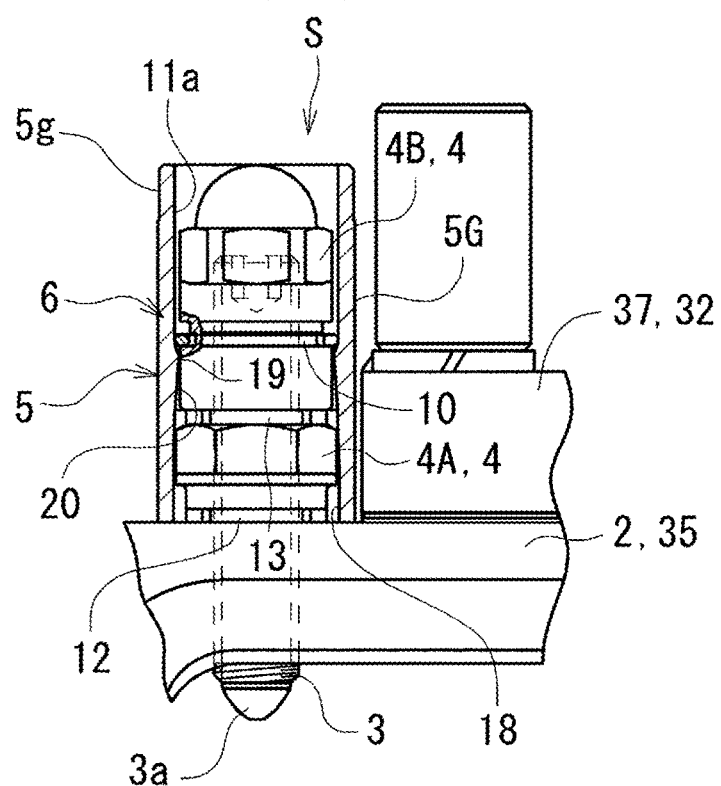
FIGS. 8A and 8B show the cover of a different structure, where
Figure 8B:
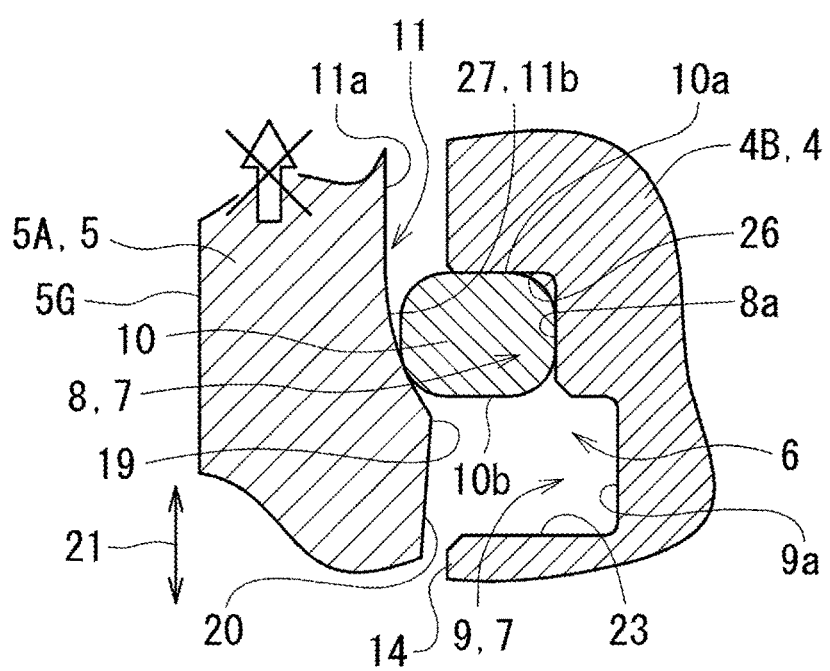

The adjustment prevention mechanism S may be configured such that the lower-side circumferential face 25 of the inner circumference groove 11 of the cover 5 according to Embodiment 1 is provided on a circumferential face 27 on an inclination side according to Embodiment 2 illustrated in FIG. 8B.

According to Embodiments 1 and 2, the locknut 4 is configured by two locknuts 4A and 4B. However, a device with adjustment bolt having a single locknut 4 capable of locking the cover 5 may be employed.

Embodiment 2

The cover 5 in the adjustment prevention mechanism S may have a configuration illustrated in FIGS. 8A and 8B. Specifically, as illustrated in FIGS. 8A and 8B, the cover 5 according to Embodiment 2 includes an inner circumferential portion having the opening inner circumferential face 18, the tapered inner circumferential face 20, the short main inner circumferential face 19, and a smaller diameter portion 11a on the base end (on the upper side), and configured into a pipe shape constituted only by the tubular unit 5A without the reinforced portion 22.

In other words, as compared to the cover 5 according to Embodiment 1, the cover 5 is configured such that the cap portion 5B (cf. FIG. 2) is not provided and that an end of the tubular unit 5A on the side opposite of the bolt attachment wall side is opened, and includes a variable-diameter stepped portion (one example of attachment inner circumference unit) 11 in a shape that a groove bottom 11a of the inner circumference groove 11 (cf. FIG. 2) continues endlessly on the side opposite of the bolt attachment wall side and the upper side circumferential face 24 is omitted.

Further, a circumferential face 11b of the variable-diameter stepped portion 11 on the bolt attachment wall side (lower side) is provided for an inclination-side circumferential face 27 that is curved so that its diameter becomes smaller toward the bolt attachment wall side (lower side). Here, an upper end portion of an outer circumferential face 5G of the cover 5 is provided as an upper-end contraction face 5g whose diameter is slightly smaller. The variable-diameter stepped portion 11, the retaining ring 10, and the external circumference groove 7 constitute the stopper unit 6.

An adjustment locking effect of the adjustment prevention mechanism S according to Embodiment 2 by restricting upward movement of the cover 5 is basically the same as that of Embodiment 1, and only different in a state of contact between the cover 5 and the retaining ring 10. Specifically, as illustrated in FIG. 8B, in the state in which the retaining ring 10 moves upward due to contact with the inclination-side circumferential face 27 along with upward movement of the cover 5, and is brought into contact with the upper-side circumferential face 26, a contracting force due to inclination of the inclination-side circumferential face 27 acts and the retaining ring 10 is also brought into contact with the groove bottom 8a of the first groove portion 8, and in this state, upward movement of the cover 5 is inhibited.

Embodiment 3

Figure 9:
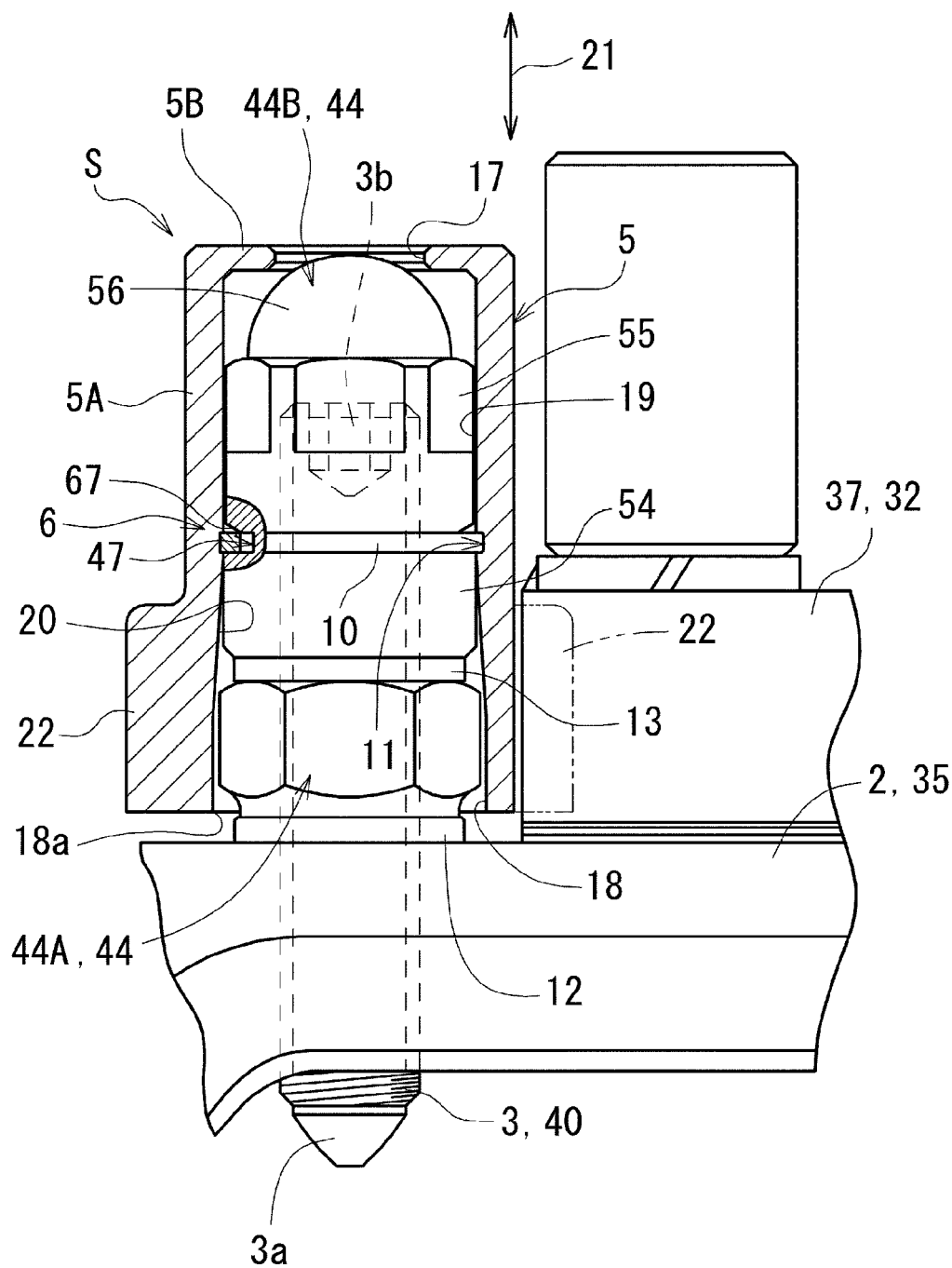
FIG. 9 is a partially cut-out front view illustrating a structure of an adjustment bolt for an amount of fuel consumption (Embodiment 3)
Figure 10:
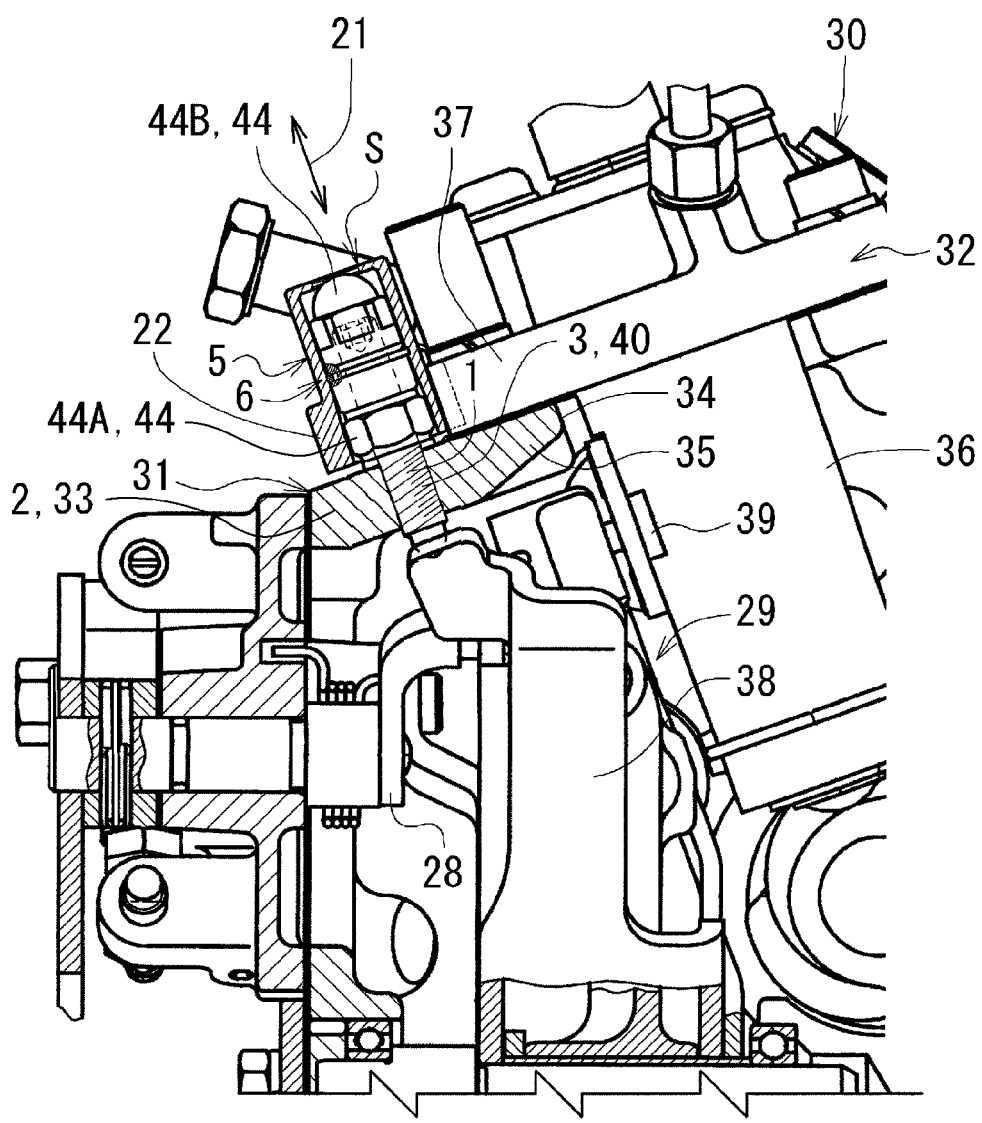
FIG. 10 is a longitudinal sectional view of a main part of a diesel engine having the adjustment bolt illustrated in FIG. 9.

As illustrated in FIG. 9 and FIG. 10, there is provided the adjustment prevention mechanism S that disallows rotating manipulation of the adjustment bolt 3 to inhibit an adjustment function of the fuel conditioner 40.

As illustrated in FIG. 9, the function of the adjustment prevention mechanism S is such that the locknut 44 is covered and sealed by the cover 5 to prevent alteration of an adjustment position of the adjustment bolt 3 after an amount of fuel consumption at the maximum power output of the engine is adjusted by the adjustment bolt 3. The cover 5 is configured such that the cover 5 may not be removed without destruction once attached to the locknut 44.

As illustrated in FIG. 9 and FIG. 10, the adjustment prevention mechanism S according to Embodiment 3 includes the bolt attachment wall 2 provided with the internal thread hole 1, the adjustment bolt 3, the locknut 44 screwed with the adjustment bolt 3, the cover 5 having a tubular unit 5A that surrounds the adjustment bolt 3 and the locknut 44 and fitted around the locknut 44, and a stopper unit 6 that causes the cover 5 to be in the removal disallowed state from the locknut 44.

The locknut 44 is configured in a double-nut structure having a first locknut 44A in contact with the bolt attachment wall 2 with a plain washer 12 interposed therebetween, and a second locknut 44B in contact with the first locknut 44A with a plain washer 13 interposed therebetween. The second locknut 44B is configured as a hexagon cap nut having a columnar body portion 54, a nut portion 55, and a semi-spherical cap 56.

The stopper unit 6 includes a C-shaped retaining ring 10, an attachment inner circumference unit 11 provided for the cover 5 so as to allow internal attachment to the retaining ring 10 in the removal disallowed state, and an external circumference groove 47 provided for the body portion 14 of the second locknut 44B so as to allow external attachment to the retaining ring 10. Here, an inner circumference groove 11 is employed as one example of the attachment inner circumference unit 11.

Figure 13:
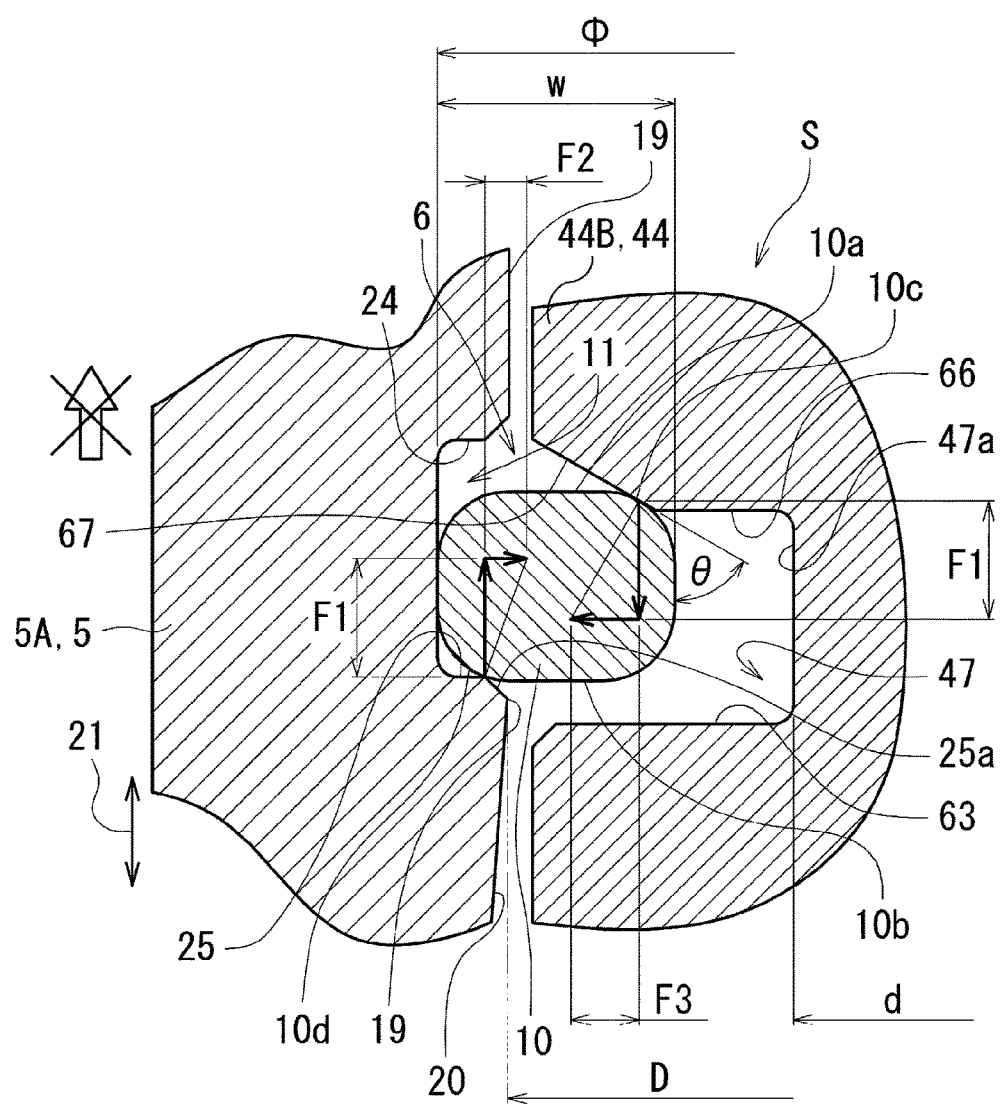
FIG. 13 is a cross-sectional view of the main part illustrating an effect of an adjustment prevention mechanism along with the cover moving upward.

As illustrated in FIG. 13, the external circumference groove 47 includes a groove bottom 47a that allows removal of the retaining ring 10 that is internally attached to, that is, fitted within the inner circumference groove 11 from the inner circumference groove 11 due to contraction. Further, an outer circumferential portion of an upper-side circumferential face 66 of the external circumference groove 47 on the side opposite of the bolt attachment wall side (upper side) is provided with an inclined face (inclined circumferential face) 67 generating an expanding force to expand the retaining ring 10 by contact with the retaining ring 10 fitted within the inner circumference groove 11 in the bolt axis direction 21. Example of the inclined face 67 includes a plane provided by C chamfer plane processing.

As illustrated in FIG. 13, in the cover 5, it is defined that a diameter of the main inner circumferential face 19 having a smallest diameter that forcibly contracts the retaining ring 10 to allow its passage, specifically, the main inner circumferential face (passage restricting inner circumferential face) 19 between the tapered inner circumferential face 20 and the inner circumference groove 11 is D, the width of the retaining ring 10 in the diameter direction is w, and a diameter of the groove bottom 47a of the external circumference groove 47 is d. In this case, the following expression (1) is established in order to realize "a groove bottom 47a that allows removal of the retaining ring 10 fitted within the attachment inner circumference unit 11 from the attachment inner circumference unit 11 due to contraction".

$$d < D - 2w \qquad (1)$$

In this case, where the diameter of the inner circumference groove 11 is Φ, the state in which the external diameter of the retaining ring 10 when fitted within the inner circumference groove 11 matches the diameter Φ of the inner circumference groove 11, that is, the diameter Φ of the inner circumference groove 11 is the same as or slightly smaller than the external diameter of the retaining ring 10 in the unlocked state is desirable. However, the diameter Φ of the inner circumference groove 11 may be slightly larger than the external diameter of the retaining ring 10 in the unlocked state.

As illustrated in FIG. 13, an outer circumferential side end of the upper-side circumferential face 66 of the external circumference groove 47 is provided with the inclined face 67 with which an inner upper corner 10c of the retaining ring 10 in the state fitted within the inner circumference groove 11 is brought into contact. The inclined face 67 is set so that its angle θ to the bolt axis direction 21 is from 45 to 70 degrees, and preferably from 55 to 65 degrees. In FIG. 13, the angle θ is shown to be 60 degrees. Therefore, as the retaining ring 10 is pressed against the inclined face 67 in the bolt axis direction 21, a component force outward in the diameter direction is produced by the inclination angle θ (cf. F3 in FIG. 13). Specifically, the angle θ of the inclined face 67 allows the configuration that "an inclined face 67 is provided for an outer circumferential portion of a side circumferential face 66 of the external circumference groove 47 on a side opposite of the bolt attachment wall, the inclined face 67 generating an expanding force to expand the retaining ring 10 by contact with the retaining ring 10 fitted within the attachment inner circumference unit 11 in an bolt axis direction".

As illustrated in FIG. 9 and FIG. 10, the cover 5 includes the tubular unit 5A having the cylindrical cross-section, and the cap portion 5B having the circular hole 17 in the center, and the opening side of the tubular unit 5A is configured as the large-diameter reinforced portion 22.

An inner circumferential portion of the tubular unit 5A includes the opening inner circumferential face 18 having a largest and even diameter and provided on the bolt attachment wall side (tip end side), the main inner circumferential face 19 having a diameter smaller than that of the opening inner circumferential face 18 and provided on a side opposite of the bolt attachment wall side (base end side), and the tapered inner circumferential face 20 having a diameter variable along the bolt axis direction 21 and connecting the opening inner circumferential face 18 with the main inner circumferential face 19.

Specifically, the inner circumferential portion of the cover 5 is provided with the tapered inner circumferential face 20 tapered inwardly and having the opening portion 18a having a diameter larger than the external diameter of the retaining ring 10 in the unlocked state on the bolt attachment wall side of the inner circumference groove 11. The inner circumference groove 11 is provided for the main inner circumferential face 19 near the border with the tapered inner circumferential face 20.

Here, as illustrated in FIG. 7, the reinforced portion 22 of the cover 5 is provided with a flat face 22A that is partially depressed so as to have a D-shaped cross-section. The flat face 22A is configured to have a shape and dimensions so as to be closely fitted with a flat side face 37a of the flange 37 of the fuel injector pump 32 with only a small gap in the state fitted around the locknut 4. Therefore, in the state fitted around the locknut 4, the cover 5 may not be manipulated to rotate due to a structure in which the flat face 22A and the side face 37a face closely each other.

As illustrated in FIG. 6A, the retaining ring 10 is configured as a circlip having a constant width a in the diameter direction that is the C-shaped retaining ring 10. Further, as illustrated in FIG. 6B, the retaining ring 10 is also configured helically twisted in its thickness direction. For example, the helical retaining ring 10 is provided in a manner a coil spring is formed. Due to its helical shape, when fitted with the inner circumference groove 11 and the external circumference groove 47, the retaining ring 10 may be constantly pressed and urged to be brought in contact with the inner circumference groove 11 and the external circumference groove 47 in the bolt axis direction 21. This provides an advantageous effect of prevention of noises due to vibration or the like.

Next, a process for attachment of the cover 5 to the locknut 44 by the adjustment prevention mechanism S according to Embodiment 3 and an effect thereof will be described. First, the retaining ring 10 illustrated in FIGS. 6A and 6B is fitted into the external circumference groove 47 of the second locknut 44B that is screwed into and fixed to the adjustment bolt 3.

Figure 11A:
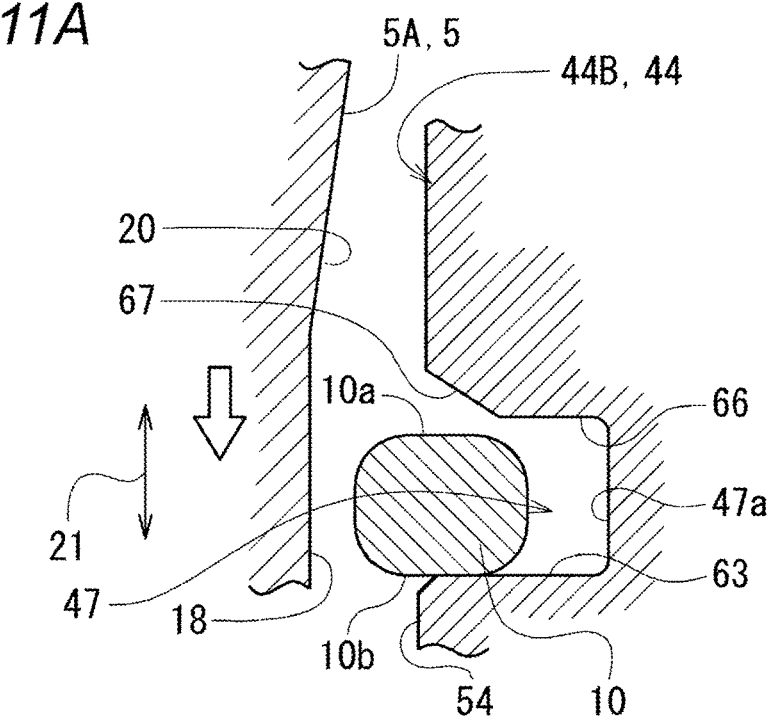
FIG. 11A is a cross-sectional view of a main part illustrating a positional relation between an attachment groove and a retaining ring for a hexagon cap nut in an unlocked state.

Then, as illustrated in FIG. 11A, the cover 5 is moved downward onto the adjustment bolt 3 in a manner the reinforced portion 22 faces downward. At this time, as a diameter of the opening inner circumferential face 18 is larger than the external diameter of the retaining ring 10 in the unlocked state, the retaining ring 10 is maintained to be placed on a lower-side circumferential face 23 of the external circumference groove 47.

Figure 11B:
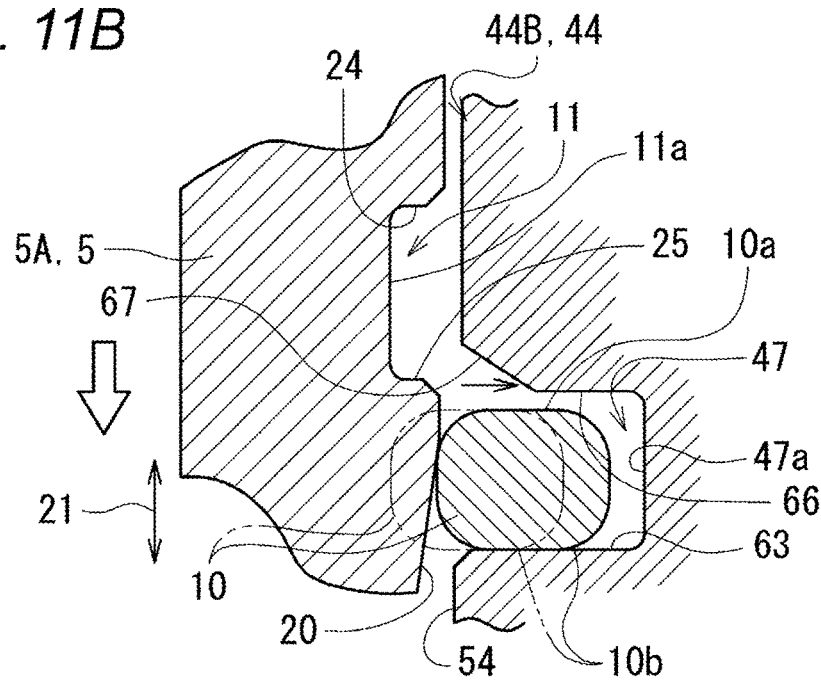
FIG. 11B is a cross-sectional view of the main part illustrating contracting deformation of the retaining ring when starting an operation of moving the cover downward.

Continuing downward movement of the cover 5 for fitting, as illustrated in FIG. 11B, the tapered inner circumferential face 20 is brought into external contact with the retaining ring 10, and a strong inward force in the diameter direction is produced due to slight inclination of the tapered inner circumferential face 20 in the bolt axis direction 21. Thus, the retaining ring 10 is forcibly contracted and deformed while being in contact with the lower-side circumferential face 23 of the external circumference groove 47.

Figure 12A:
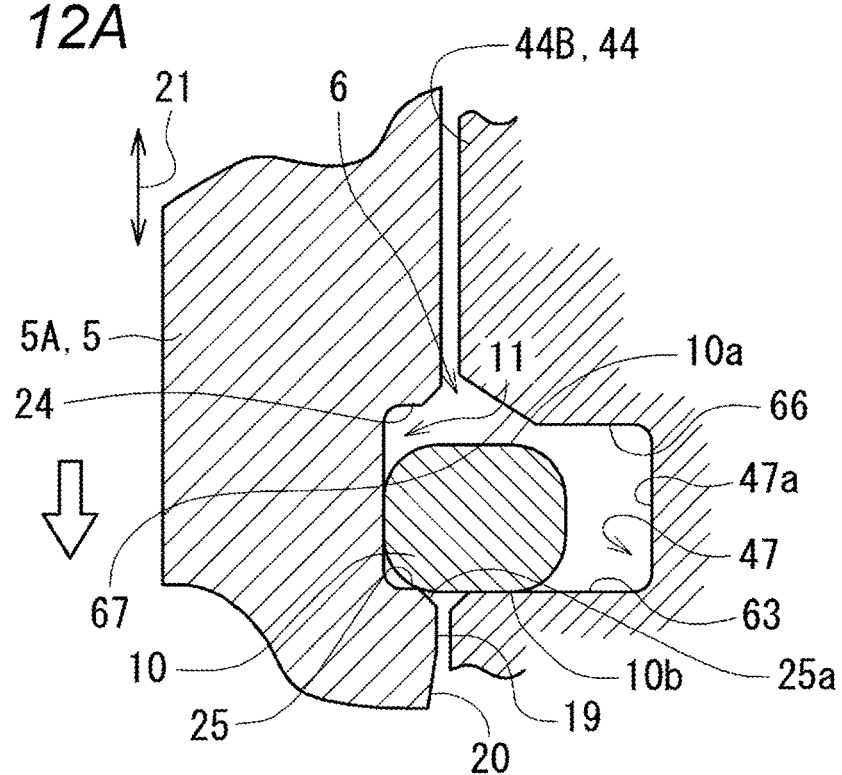
FIG. 12A is a cross-sectional view of the main part illustrating expanding deformation of the retaining ring to the cover inner circumference groove by downward movement of the cover.
Figure 12B:
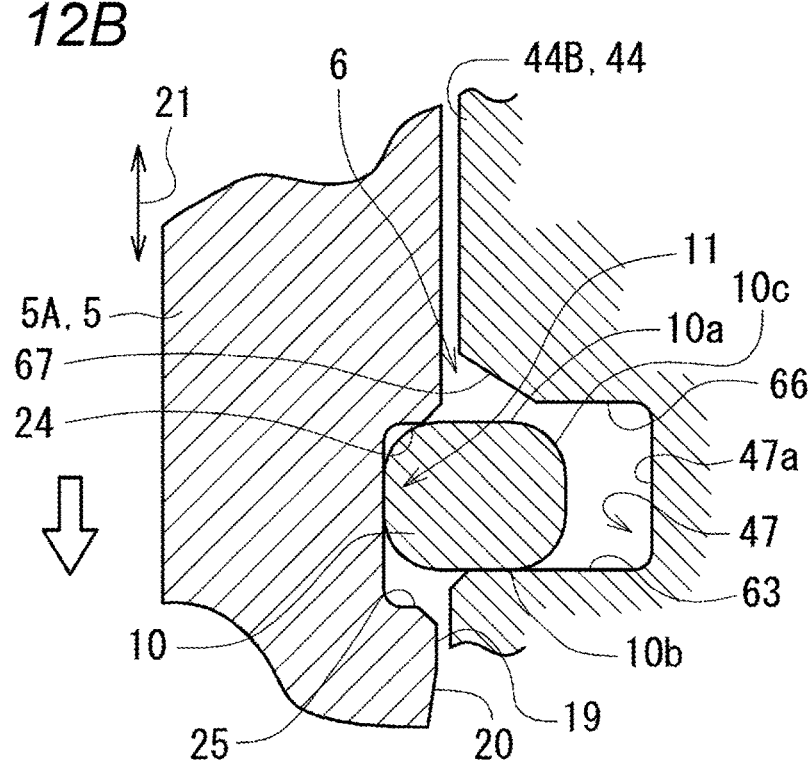
FIG. 12B is a cross-sectional view of the main part illustrating the state in which the cover is attached illustrated in FIG. 1.

Further continuing downward movement of the cover 5, as illustrated in FIG. 12A, upon relative movement and positioning of the retaining ring 10 at the inner circumference groove 11 beyond the main inner circumferential face 19 that continues from an end (upper end) of the tapered inner circumferential face 20, the retaining ring 10 instantaneously expands and deforms due to an elastic restoring force to be internally fitted within the inner circumference groove 11. Then, as illustrated in FIG. 12B, the cover 5 stops moving downward when an upper side circumferential face 24 on the side opposite of the bolt attachment wall side (upper side) of the inner circumference groove 11 is brought into contact with an upper face 10a of the retaining ring 10. This is a fitted state illustrated in FIG. 1. It should be noted that if an expanding elastic force of the retaining ring 10 is strong, the cover 5 may often not be moved down to a position at a lower end.

Now, a case in which the cover 5 assembled with the second locknut 44B into the fitted state (cf. FIG. 9 and FIG. 13) is moved upward to be removed will be described.

Upon upward movement of the cover 5 in the fitted state illustrated in FIG. 12B, as illustrated in FIG. 13, the lower-side circumferential face 25 of the inner circumference groove 11 on a bolt attachment wall side (lower side) is also moved upward in contact with the retaining ring 10 placed on the lower-side circumferential face 23 of the external circumference groove 47, and the retaining ring 10 is brought into contact with the upper-side circumferential face 66 and stops.

Even if upward movement of the cover 5 is continued from the state illustrated in FIG. 13, the upper face 10a of the retaining ring 10 that is to be moved upward along with the lower-side circumferential face 25 of the inner circumference groove 11 is brought into contact with the upper-side circumferential face 66 of the external circumference groove 47, thus stopping further upward movement of the cover 5.

At this time, as illustrated in FIG. 13, the round inner upper corner 10c of the retaining ring 10 on the inner circumference side and on the upper side is brought into contact with the inclined face 67 provided for the outer circumferential portion of the upper-side circumferential face 66.

Thus, as a vector of the force is indicated by an arrow in FIG. 13, a removing force F1 for the cover 5 generates a force F3 in a direction to expand the retaining ring 10, and the retaining ring 10 moves radially inward of the external circumference groove 47 to inhibit contraction and removal from the inner circumference groove 11.

At this time, depending on sizes of and a relation between a C chamfer plane processed portion 25a of the lower-side circumferential face 25 of the inner circumference groove 11 on an inner circumferential end and a round outer lower corner 10d of the retaining ring 10 on the outer circumference side and on the lower side, the outer lower corner 10d is often brought into contact with the C chamfer plane processed portion 25a. In such a case, a force F2 for contracting the retaining ring 10 is produced.

However, as the angles and the dimensions of the corners 10c and 10d of the retaining ring 10, the inclined face 67, and the C chamfer plane processed portion 25a are set so as to establish F3>F2, the retaining ring 10 remains in contact with the groove bottom 11a of the inner circumference groove 11, and functions so as to inhibit removal of the cover 5.

In the example shown in FIG. 13, the inclined face 67 and the inner upper corner 10c are in contact, and the angle at the contact portion to the bolt axis direction 21 is about 60 degrees. On the other hand, the outer lower corner 10d is in contact, not with the C chamfer plane processed portion 25a itself, but with a corner portion between the C chamfer plane processed portion 25a and the lower-side circumferential face 25, and the angle at the contact portion to the bolt axis direction 21 is about 75 degrees. In other words, the angle to the bolt axis direction 21 at the portion where the inner upper corner 10c and the inclined face 67 are in contact is configured to be smaller than the angle to the bolt axis direction 21 at the portion where the outer lower corner 10d and the C chamfer plane processed portion 25a are in contact. As a result of such a configuration, F3>F2 is established.

As described above, there is provided the adjustment prevention mechanism S according to Embodiment 3 that disallows removal of the cover 5 by upward movement after the cover 5 is assembled with the adjustment bolt 3 with which the locknut 44 having the retaining ring 10 is screwed by moving the cover 5 down until the retaining ring 10 is fitted within the inner circumference groove 11. Thus, by attachment of the cover 5 to the locknut 44 (to the adjustment bolt 3), the adjustment prevention mechanism S functions so as not to allow rotating manipulation of the adjustment bolt 3.

In order to forcibly remove the cover 5, it is necessary to cause shear fracture to the retaining ring 10, and therefore an advantageous effect that a pull-up bearing force of the cover 5 improves to a large extent (e.g., a load bearing of 1-2 tons) is provided as compared to a unit for pressing the cover into the locknut or for partially cutting and flexing the lower end of the cover inwardly to latch the locknut, for example.

According to the adjustment prevention mechanism S of Embodiment 3, the locknut 44 is configured by two locknuts 44A and 44B. However, a device with adjustment bolt having a single locknut 44 capable of locking the cover 5 may be employed.

Other than the inner circumference groove 11, examples of the attachment inner circumference unit 11 may include a variable-diameter stepped portion configured such that the groove bottom 11a extends to the upper end of the cover 5 and the upper side circumferential face 24 is omitted.

A device with adjustment bolt according to the present invention has following features (1) through (8).

(1) A circumferential face 11b of the attachment inner circumference unit 11 on the side of the bolt attachment wall is provided for an inclination-side circumferential face 27, a diameter of the inclination-side circumferential face 27 decreasing toward the side of the bolt attachment wall.

Accordingly, a circumferential face of the attachment inner circumference unit on the side of the bolt attachment wall is provided for an inclination-side circumferential face, a diameter of the inclination-side circumferential face decreasing toward the side of the bolt attachment wall. Therefore, as the retaining ring is brought into contact with an inclined side circumferential face along with removal movement of the cover and moves upward, and with an upper-side circumferential face of the first groove portion, the retaining ring is also brought into contact with the groove bottom of the first groove portion by a contracting force due to inclination of the inclined side circumferential face.

Therefore, the retaining ring that inhibits removal of the cover is positioned without a gap on a radially inward side, and rattling in removal manipulation is eliminated. Thus, it is possible to prevent unauthorized removal of a cover more strongly.

(2) There is provided a device with adjustment bolt comprising:

a bolt attachment wall 2 having an internal thread hole 1;

an adjustment bolt 3 screwed with the internal thread hole 1 and attached to the bolt attachment wall 2;

a locknut 44 screwed with the adjustment bolt 3;

a cover 5 fitted around the locknut 4, the cover 5 having a tubular unit 5A that surrounds the adjustment bolt 3 and the locknut 44; and a stopper unit 6 causing the cover 5 to be in a removal disallowed state from the locknut 44, wherein the stopper unit 6 includes a retaining ring 10, an attachment inner circumference unit 11 provided for the cover 5 so as to allow internal attachment to the retaining ring 10 in the removal disallowed state, and an external circumference groove 47 provided for the locknut 44 so as to allow external attachment to the retaining ring 10, the external circumference groove 47 includes a groove bottom 47a that allows removal of the retaining ring 10 fitted within the attachment inner circumference unit 11 from the attachment inner circumference unit 11 due to contraction, an inclined face 67 is provided for an outer circumferential portion of a side circumferential face 66 of the external circumference groove 47 on a side opposite of the bolt attachment wall, the inclined face 67 generating an expanding force to expand the retaining ring 10 by contact with the retaining ring 10 fitted within the attachment inner circumference unit 11 in an bolt axis direction.

Accordingly, it is possible to provide an effect of preventing unauthorized removal of the cover for sealing the adjustment bolt so as not to allow re-adjustment of the adjustment bolt after shipping.

Specifically, the cover to be removed from the locknut away from the bolt attachment wall is configured to be locked to the locknut by the retaining ring. Therefore, unlike the conventional art, it is possible to prevent unauthorized removal of the cover, as a tool insertion opening such as a slit for deformation is not required for a peripheral wall of the cover, and the cover may not be removed unless the retaining ring is destructed by shear fracture, which requires an extremely powerful force.

As a result, a device with adjustment bolt capable of preventing unauthorized removal of the cover that prevents alteration of the adjustment position of the adjustment bolt may be provided by making an original attempt such as providing the locknut with an external circumference groove including a groove bottom that allows contraction to remove the retaining ring from the attachment inner circumference unit provided for an inner circumference of the cover, and an inclined face that produces a force for expansion by contact between the retaining ring and the inclined face in the bolt axis direction.

(3) At the inner circumferential portion of the cover 5, a tapered inner circumferential face 20 is provided for the attachment inner circumference unit 11 on the side of the bolt attachment wall, the tapered inner circumferential face 20 being tapered inwardly, the tapered inner circumferential face 20 having an opening portion 18a whose diameter is larger than an external diameter of the retaining ring 10 in an unlocked state.

Accordingly, at the inner circumferential portion of the cover, a tapered inner circumferential face is provided for the attachment inner circumference unit on the side of the bolt attachment wall, the tapered inner circumferential face being tapered inwardly, the tapered inner circumferential face having an opening portion whose diameter is larger than an external diameter of the retaining ring in an unlocked state. Therefore, the following effect may be achieved.

Specifically, by moving the cover so as to cover the locknut screwed with the adjustment bolt in the bolt axis direction in a state in which the retaining ring is fitted onto the locknut, contact with the tapered inner circumferential face causes the retaining ring to contract and deform at the second groove portion, and the retaining ring finally expands and moves to the attachment inner circumference unit to be fitted.

In other words, as it is possible to fit the cover around the locknut in the removal disallowed state only by moving the cover to the bolt attachment wall side, assembly may be carried by in a convenient manner.

(4) The retaining ring 10 is configured to be helical.

Accordingly, due to the helical shape of the retaining ring, when fitted with the attachment inner circumference unit or the external circumference groove, the retaining ring may be constantly pressed and urged to be brought in contact with attachment inner circumference unit or the external circumference groove in the bolt axis direction. As a result, an advantageous effect of noise suppression or prevention, such as reducing or suppressing noises due to vibration of the retaining ring.

(5) The attachment inner circumference unit 11 is configured by an inner circumference groove.

Accordingly, it is possible to perform positioning of the cover and the locknut in the bolt axis direction as the attachment inner circumference unit fitted within the retaining ring is configured by an inner circumference groove.

(6) The locknut 4, 44 is configured in a double-nut structure having a first locknut 4A, 44A and a second locknut 4B, 44B, the first locknut 4A, 44A acting on the bolt attachment wall 2, the second locknut 4B, 44B acting on the first locknut 4A, 44A.

Accordingly, the locknut is configured in a double-nut structure having a first locknut acting on the bolt attachment wall and a second locknut acting on the first locknut. Therefore, it is possible to perform positioning and fixation of the adjustment bolt more strongly and reliably as compared to a single-nut structure. Further, as the second locknut that requires an attachment structure to the cover is separately provided from the first locknut that requires a locking function of the bolt, there is an advantageous effect of improving a degree of freedom in design for the retaining structure of the cover.

(7) The second locknut 4B, 44B is configured as a hexagon cap nut.

Accordingly, as the second locknut is configured as a hexagon cap nut, a bolt base end such as a tool engagement unit used to manipulate and rotate the bolt may be covered by the hexagon cap nut. Therefore, unauthorized manipulation of the bolt may be more strongly prevented.

(8) The cover 5 is configured to have one of structures in which an end of the tubular unit 5A on a side opposite of the bolt attachment wall is open, and in which the cover 5 includes a cap portion 5B having a hole 17.

Accordingly, it is not necessary to provide a sealed cover while disallowing adjustment of the adjustment bolt, and the base end of the cover may be an opening or a cap portion having a hole. Therefore, it is possible to provide an advantageous effect that the shape of the cover base end may be freely designed.

What is claimed is:

1. A device with adjustment bolt comprising:
   a bolt attachment wall having an internal thread hole;
   an adjustment bolt screwed with the internal thread hole and attached to the bolt attachment wall;
   a locknut screwed with the adjustment bolt;
   a cover fitted around the locknut, the cover having a tubular unit that surrounds the adjustment bolt and the locknut; and
   a stopper unit causing the cover to be in a removal disallowed state from the locknut, wherein the stopper unit includes a retaining ring, an attachment inner circumference unit provided in the cover so as to allow internal attachment to the retaining ring in the removal disallowed state, and an external circumference groove provided on the locknut so as to allow external attachment to the retaining ring, the external circumference groove includes a first groove portion and a second groove portion provided continuously with the first groove portion on a side of the bolt attachment wall, the first groove portion having a groove bottom that restricts removal of the retaining ring fitted within the attachment inner circumference unit from the attachment inner circumference unit due to contraction, the second groove portion having a groove bottom that allows removal of the retaining ring fitted within the attachment inner circumference unit from the attachment inner circumference unit due to contraction.

2. The device with adjustment bolt according to claim 1, wherein a circumferential face of the attachment inner circumference unit on the side of the bolt attachment wall provides an inclination-side circumferential face, a diameter of the inclination-side circumferential face decreasing toward the side of the bolt attachment wall.

3. The device with adjustment bolt according to claim 1, wherein at the inner circumferential portion of the cover, a tapered inner circumferential face is provided for the attachment inner circumference unit on the side of the bolt attachment wall, the tapered inner circumferential face being tapered inwardly, the tapered inner circumferential face having an opening portion whose diameter is larger than an external diameter of the retaining ring in an unlocked state.

4. The device with adjustment bolt according to claim 1, wherein the retaining ring is configured to be helical.

5. The device with adjustment bolt according to claim 1, wherein the attachment inner circumference unit is configured by an inner circumference groove.

6. The device with adjustment bolt according to claim 1, wherein the locknut is configured in a double-nut structure having a first locknut and a second locknut, the first locknut acting on the bolt attachment wall, the second locknut acting on the first locknut.

7. The device with adjustment bolt according to claim 6, wherein the second locknut is configured as a hexagon cap nut.

8. The device with adjustment bolt according to claim 7, wherein the cover is configured to have one of structures in which an end of the tubular unit on a side opposite of the bolt attachment wall is open, and in which the cover includes a cap portion having a hole.

9. A device with adjustment bolt comprising:
a bolt attachment wall having an internal thread hole;
an adjustment bolt screwed with the internal thread hole and attached to the bolt attachment wall;
a locknut screwed with the adjustment bolt;
a cover fitted around the locknut, the cover having a tubular unit that surrounds the adjustment bolt and the locknut; and
a stopper unit causing the cover to be in a removal disallowed state from the locknut,
wherein the stopper unit includes a retaining ring, an attachment inner circumference unit provided in the cover so as to allow internal attachment to the retaining ring in the removal disallowed state, and an external circumference groove provided on the locknut so as to allow external attachment to the retaining ring,
the external circumference groove includes a groove bottom that allows removal of the retaining ring fitted within the attachment inner circumference unit from the attachment inner circumference unit due to contraction,
an inclined face is provided on an outer circumferential portion of a side circumferential face of the external circumference groove on a side opposite of the bolt attachment wall, the inclined face generating an expanding force to expand the retaining ring by contact with the retaining ring fitted within the attachment inner circumference unit in an bolt axis direction.

10. The device with adjustment bolt according to claim 9, wherein at the inner circumferential portion of the cover, a tapered inner circumferential face is provided for the attachment inner circumference unit on the side of the bolt attachment wall, the tapered inner circumferential face being tapered inwardly, the tapered inner circumferential face having an opening portion whose diameter is larger than an external diameter of the retaining ring in an unlocked state.

11. The device with adjustment bolt according to claim 9, wherein the retaining ring is configured to be helical.

12. The device with adjustment bolt according to claim 9, wherein the attachment inner circumference unit is configured by an inner circumference groove.

13. The device with adjustment bolt according to claim 9, wherein the locknut is configured in a double-nut structure having a first locknut and a second locknut, the first locknut acting on the bolt attachment wall, the second locknut acting on the first locknut.

14. The device with adjustment bolt according to claim 13, wherein the second locknut is configured as a hexagon cap nut.

15. The device with adjustment bolt according to claim 14, wherein the cover is configured to have one of structures in which an end of the tubular unit on a side opposite of the bolt attachment wall is open, and in which the cover includes a cap portion having a hole.

* * * * *